(12) United States Patent
Izakov

(10) Patent No.: US 7,489,257 B2
(45) Date of Patent: Feb. 10, 2009

(54) TRAFFIC LAW VIOLATION RECORDING AND TRANSMITTING SYSTEM

(76) Inventor: Doron Izakov, 2 Geiger st., (entrance C, Apt. 39), Tel Aviv 69341 (IL)

( * ) Notice: Subject to any disclaimer, the term of this patent is extended or adjusted under 35 U.S.C. 154(b) by 326 days.

(21) Appl. No.: 11/530,511

(22) Filed: Sep. 11, 2006

(65) Prior Publication Data

US 2008/0068461 A1    Mar. 20, 2008

(51) Int. Cl.
*G01C 23/00* (2006.01)

(52) U.S. Cl. .................. 340/973; 345/355; 345/302; 348/469; 348/12; 348/443; 348/384

(58) Field of Classification Search .............. 340/937; 348/469, 12, 443, 384, 397; 345/302, 355
See application file for complete search history.

(56) References Cited

U.S. PATENT DOCUMENTS

| | | | | |
|---|---|---|---|---|
| 5,815,093 A | | 9/1998 | Kikinis | 340/937 |
| 6,037,991 A | * | 3/2000 | Thro et al. | 725/116 |
| 6,144,375 A | * | 11/2000 | Jain et al. | 715/251 |
| 2003/0154009 A1 | | 8/2003 | Basir et al. | 701/35 |
| 2003/0233261 A1 | | 12/2003 | Kawahara et al. | 705/4 |
| 2004/0113763 A1 | | 6/2004 | Bendavid et al. | 340/436 |
| 2005/0259151 A1 | | 11/2005 | Hamilton et al. | 348/148 |

FOREIGN PATENT DOCUMENTS

JP    200512671    5/2005

* cited by examiner

*Primary Examiner*—Jeff Hofsass
*Assistant Examiner*—Ojiako Nwugo
(74) *Attorney, Agent, or Firm*—Martin Fleit; Paul D. Bianco; Fleit Gibbons Gutman Bongini & Bianco PL

(57) ABSTRACT

Presented herein is a system that enables a vehicle operator to record continuous images of surrounding traffic activity, wherein the vehicle is equipped with a video camera 20 for continuously recording the vehicle surroundings. The system further comprises a marking switch 42 that enables the vehicle operator, upon viewing a possible traffic violation, to trigger a marking module 40; a marking module 40 that identifies and marks, in real-time, at least one location of the video recording that relates to the at least one possible traffic violation committed by at least one other vehicle operator; a portable storage device 30; an editing module 50 for preparing recorded segments for transmission, which include at least one recording portion that appears before the added mark and at least one recording portion that appears after the added mark; and a communication module 60 for transmitting the prepared recording segments to a designated server.

16 Claims, 3 Drawing Sheets

TRAFFIC LAW VIOLATION RECORDING AND TRANSMITTING SYSTEM

FIELD OF INVENTION

This invention relates generally to vehicular traffic monitoring systems, and specifically to devices used to allow individual drivers to accurately record and report violations of traffic laws by other drivers.

BACKGROUND OF THE INVENTION

Each year, traffic accidents kill thousands and injure many more. Too many of these accidents are due to the non-compliance by at least one driver to traffic laws, including exceeding posted speed limits, not stopping at stop signs, driving without seatbelts, and running red lights.

Studies show that there is a higher level of compliance with traffic laws and a correlating drop in traffic accidents when drivers are aware that their driving is being monitored by persons having the authority to mete out penalties, such as, for example, police officers. Unfortunately, many jurisdictions are not equipped to provide such monitoring in quantities that are sufficient to produce consistently positive results. Rather, the authorities are often reduced to such stop-gap methods as establishing temporary speed traps or randomly flagging down drivers for breathalyzer tests and seat belt checks.

Alternatively, automated monitoring devices may be implemented. While lack of compliance to traffic laws is of enormous concern and any tools that encourage safer driving habits are beneficial to everyone on the road, these automated devices are simply not as effective as live monitoring with regard to driver compliance with traffic laws.

Various attempts have been made to provide solutions to this non-compliance problem, by equipping private vehicles with cameras or other devices for the purpose of monitoring the activities of an individual driver and vehicle. Illustrative of such attempts are US2005259151 US2004113763, US5815093, US2003233261, US2003154009, and JP2005122671. However, these solutions rely on automated sensor activation and furthermore, are intended for individual use rather than for recording and monitoring general vehicular traffic activity.

There is a need for a system that enables a driver to create visual records, in real time, of specific traffic violations that occur around the driver, without distracting the driver from the primary task of driving, and that further allows each record to be transmitted to the appropriate reporting authorities.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

Figure 1:
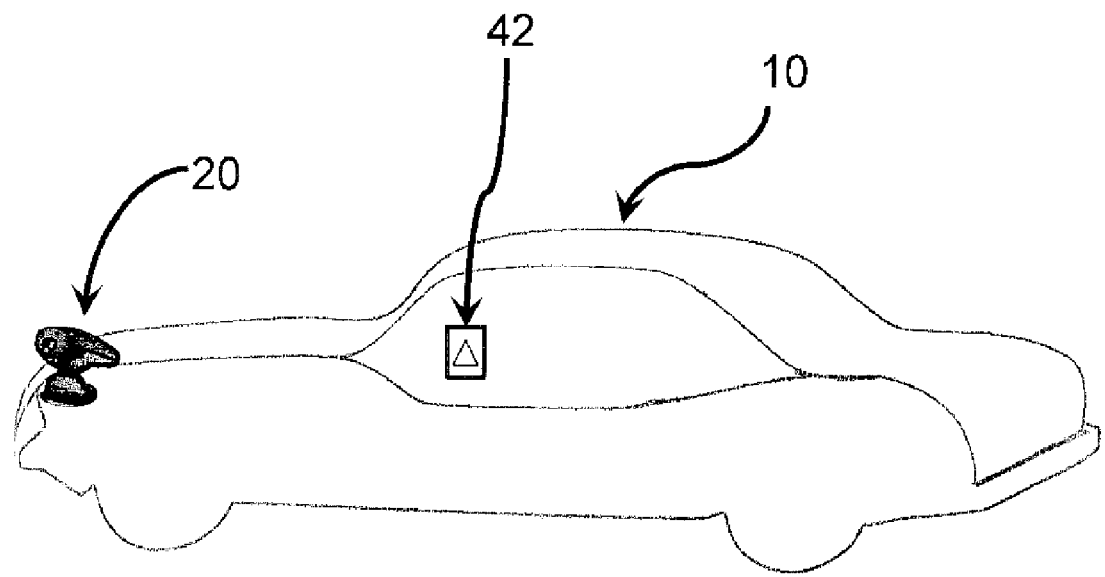
FIG. 1 is a perspective view of a vehicle equipped with a front-mounted camera according to an embodiment of the present invention.

The drawings together with the description make apparent to those skilled in the art how the invention may be embodied in practice.

No attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE EMBODIMENTS OF THE INVENTION

Presented herein is a system that enables a conventional vehicle operator to record video images of the surrounding traffic activity, wherein a vehicle operator is able to mark at least one portion of the recorded images activity that depicts at least one possible traffic violation committed by at least one other vehicle operator.

Use of embodiments of a traffic law violation recording and transmitting system as presented herein may enable a conventional vehicle operator to assist authorities in monitoring traffic and traffic violations by creating substantially accurate visual records of vehicular violations of traffic laws.

According to some embodiments the recordings may used to located hazardous drivers, e.g. drunk drivers.

An embodiment is an example or implementation of the inventions. The various appearances of "one embodiment" "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It is understood that the phraseology and terminology employed herein is not to be construed as limiting and is for descriptive purpose only.

The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, integers or groups thereof and that the terms are not to be construed as specifying components, features, steps or integers.

The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not to be construed as there being only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" refers to manners, means, techniques and procedures for accomplishing a given task including, but is not limited to those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

Figure 3:
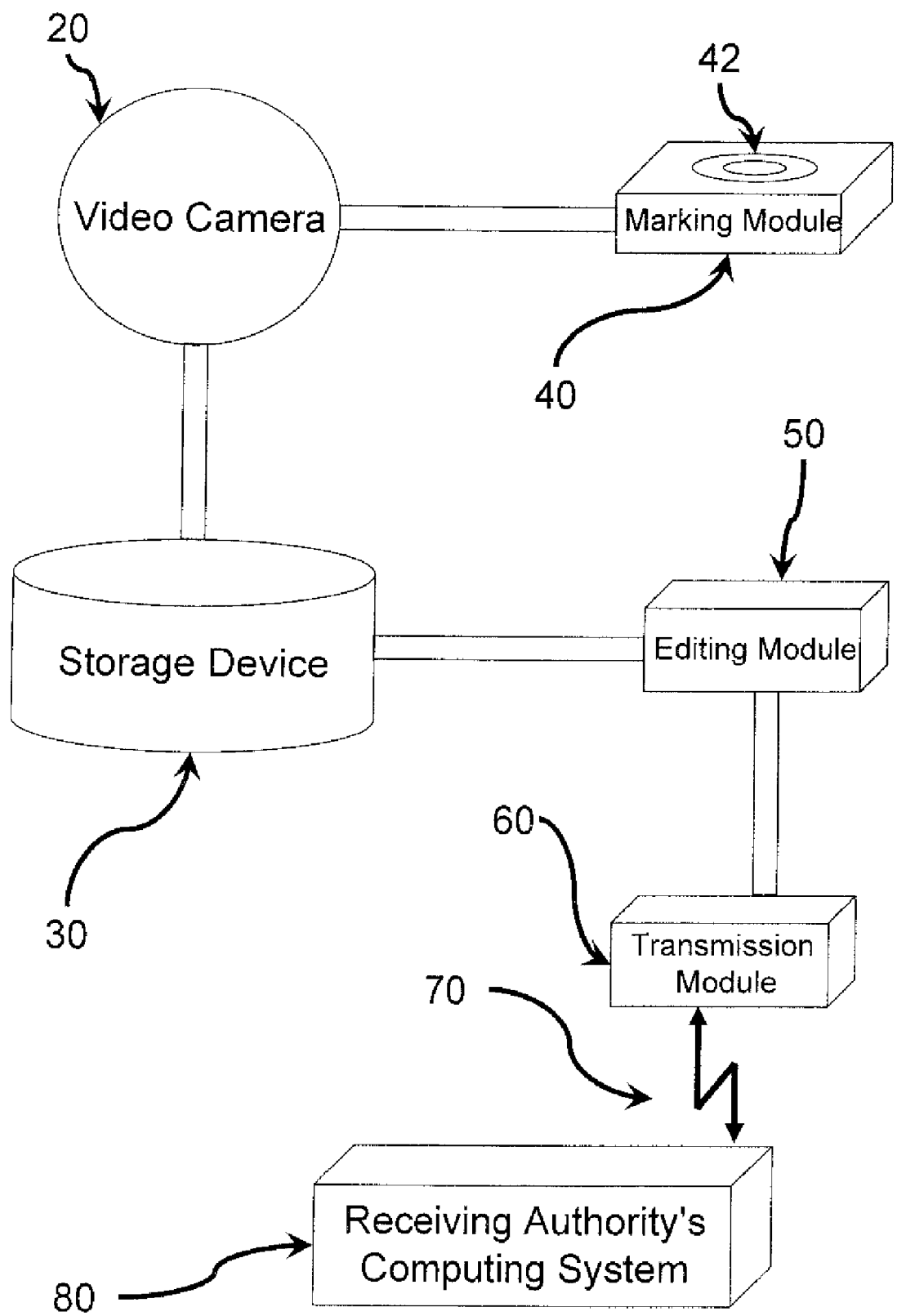
FIG. 3 describes the various components of an embodiment of the present invention.

Referring now in detail to the accompanying drawings, a traffic law violation recording and transmitting system of the present invention comprises a vehicle-mounted video camera 20 for recording surrounding traffic activity, a storage device 30 detachably and operatively connected to video camera 20 for storing the recorded activities, a marking module 40 for manually identifying and marking specific images and portions of the recorded traffic activities, an editing module 50 for preparing the marked portions of the recorded traffic activities for transmission, and a transmission module 60 for transmitting the edited segments of the recorded traffic activities over a network 70 to the receiving authority's computing system 80. These components are represented in FIG. 3.

A conventional vehicle operator may be a driver who, for example, regularly commutes to and from a job or is regularly out and about, running errands.

Figure 2:
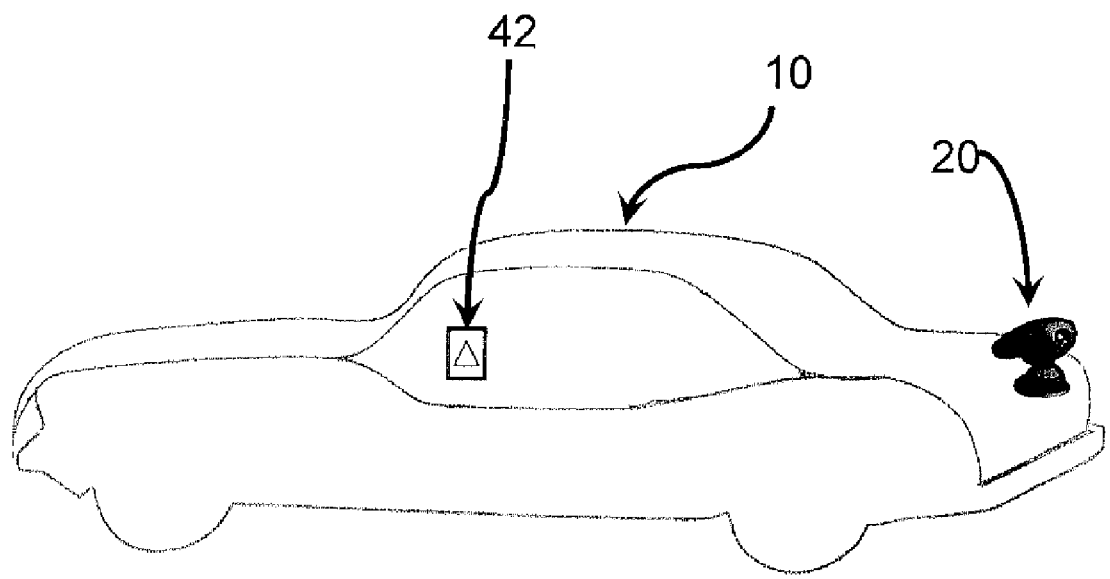
FIG. 2 is a perspective view of a vehicle equipped with a rear-mounted camera according to an embodiment of the present invention.

Video camera 20 may be mounted on, for example, the front of a motor vehicle 10, as described in FIG. 1. According to some embodiments, video camera 20 may also or only be mounted on the rear of a motor vehicle 10, as described in FIG. 2, in order to facilitate recording, for example, tailgating activities. According to some embodiments, video camera 20 may be mounted at the eye level of the driver; according to other embodiments, video camera 20 may be mounted at another level or location on motor vehicle 10. According to embodiments, video camera 20 may record continuously while motor vehicle 10 is in operation.

According to some embodiments, video camera 20 is equipped with a wide-angle lens in order to enable the capture of not only the passing vehicular traffic but also the concurrent activities of the surrounding environs. By thus including the context within which each possible violation occurred, the authorities may be able to assess more accurately the cause, and even the severity, of each possible vehicular traffic violation.

Video camera 20 is detachably and operatively connected to storage device 30. The storage device any be any type as known in the art, e.g. hard drive, Flash memory, ram memory. According to embodiments, the visual records captured by video camera 20 are automatically stored to storage device 30. Storage device 30 provides large capacity storage for storing the visual records amassed by video camera 20. Storage device 30 is capable of storing at least one hour of images. Additionally, storage device 30 is portable.

a marking module 40 is operatively associated with video camera 20, in order to mark at least one of the images recorded by video camera 20. Marking module 40 is activated manually by the vehicle operator.

The vehicle operator may activate marking module 40 by use of, for example, a marking switch 42. According to embodiments, marking switch 42 may be, inter alia, a toggle switch, a push button switch, a slide switch, a rocker switch, a voice-activated switch, a rotary switch, or a tactile switch.

According to some embodiments, marking switch 42 may further allow the operator to modify the aim of video camera 20, for example, tilt the lens left or right. Marking switch 42 may also or alternatively allow zooming in and out of video camera 20. According to some other embodiments, there may be an automatic zoom function.

According to some embodiments, marking module 40 may position an indicator or mark on a sequential section of the recorded traffic activity, wherein said mark represents a predetermined period of time prior to and subsequent to the activation of marking module 40. For example, a beginning mark may be placed at a location that represents a predefined period of time, for example, five minutes, prior to activation of marking module 40, and an ending mark may be placed at a location on the sequential images that represents a predefined period of time, for example, five minutes, after activation of marking module 40. This ensures the identification of the complete section of recorded video that contains the possible traffic law violation. The resulting marked portion of the recorded traffic activity contains sufficient information about the possible traffic law violation for a receiving authority to, for example, determine whether a traffic law violation occurred. Such information may include, for example, incidents leading up to the possible traffic law violation and the like.

An editing module 50 uses the marks placed by marking module 40 in order to retrieve and prepare the aforementioned marked portions for transmission. Editing software embedded within editing module 50 enables identification of the required marked portions according to the marks placed thereon by marking module 40. According to some embodiments, editing module 50 may further be equipped with a zoom function that allows for zooming in on specific areas of at least one recorded image, in order to, for example, capture additional details of an event or object such as, for example, a license plate number.

According to some embodiments of the present invention, once the driver is finished recording, he may remove storage device 30 from motor vehicle 10 and connect storage device 30 to a computer, which is equipped with an editing module 50, for editing.

According to some other embodiments, editing module 50 may be contained within storage device 30, thereby enabling edits to the recorded video at the time of recording.

Once the editing is complete, the recording may be transmitted to the appropriate receiving authority's computing system 80 through a transmission module 60. Transmission module 60 may include, inter alia, a WIFI connection, a cellular telephone, a conventional internet connection, a wireless internet connection, or other suitable communication methods.

According to some embodiments, where storage device 30 contains an editing module 50 as described above, the edited video may be automatically transmitted via a transmission module 60 immediately upon completion of the editing.

Figure 4:
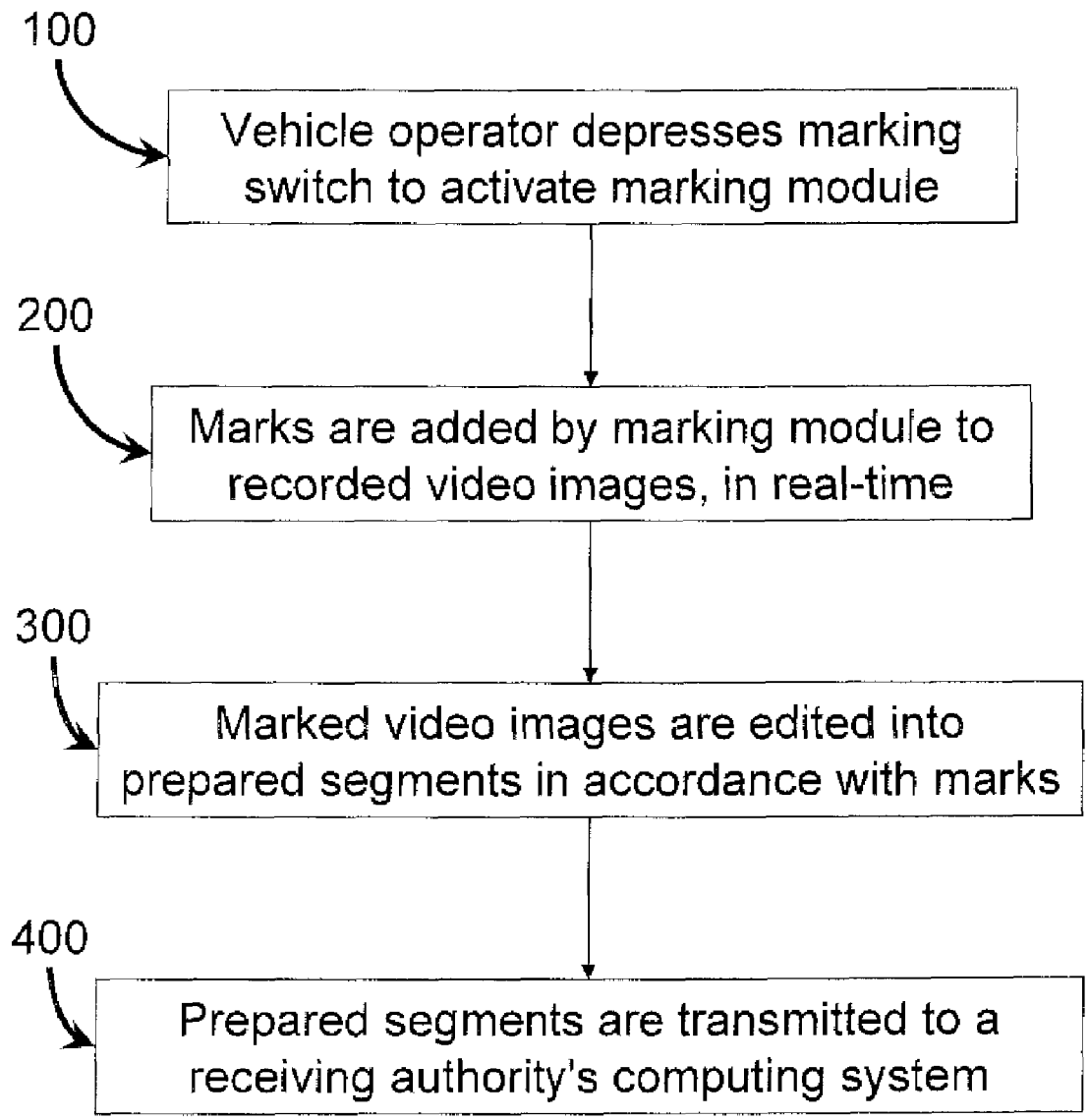
FIG. 4 is a flow chart for the present invention.

In order to more fully describe the present invention, the following describes a mode of use, with reference being made to FIG. 4.

Upon viewing a possible traffic violation, the vehicle operator may activate marking module 40 by, for example, depressing marking switch 42, in order to mark at least one of the recorded images as seen in box 100.

A mode of use may further include marking module 40 adding a mark or other place indicator to a recorded video image, in real-time, for each depression of marking switch 42 by the vehicle operator, as indicated by box 200.

As described in box 300, a mode of use may also include editing module 50 editing the marked video images into prepared segments in accordance with the placement of the marks, as described previously.

The prepared segments may then be transmitted by transmission module 60 over a communication network 70 to a receiving authority's computing system 80, as suggested in box 400.

After analysis by the appropriate personnel and where deemed applicable, said visual records of a possible traffic law violation may then be used, for example, by traffic law enforcement persons to assist in effectively addressing the recorded violation or violations.

According to some embodiments, the present invention may be further equipped with a location identification module, wherein information reflecting the location of, for example, motor vehicle 10, is embedded into the recorded images when, for example, the marking module 40 is activated. Such a location identification module may utilize, inter alia, Global Positioning System (GPS) technology, cellular telephone triangulation, or other coordinate positioning systems. According to some embodiments, said location identification module may translate, for example, the recorded longitude and latitude, to a specific location such as, for example, a street address.

According to some embodiments, vehicle operators may receive a monetary incentive in return for utilizing the traffic law violation recording and transmitting system of the present invention.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A system that enables a conventional vehicle operator to record continuous images of the surrounding traffic activity, wherein the vehicle is equipped with a video camera that captures continuous recordings of the vehicle surroundings, said system comprising:
   a marking switch that enables the vehicle operator, upon viewing a possible traffic violation committed by at least one other vehicle operator, to trigger a marking module;
   a marking module for identifying and marking in real-time at least one location of the continuous camera recording that relates to the at least one possible traffic violation committed by at least one other vehicle operator;
   an editing module for preparing recorded segments for transmission, wherein said recorded segments include at least one recording portion that appears before the added mark and at least one recording portion that appears after the added mark;
   a storage device for storing at least one portion of the camera recordings; and
   a communication module for transmitting the prepared recording segments to a designated server.

2. The system of claim 1 wherein the editing module and communication module are located within the vehicle.

3. The system of claim 1 wherein the editing module and communication module are located at an external computing terminal.

4. The system of claim 1 wherein the editing module is located within the vehicle and the communication module is located at an external computing terminal.

5. The system of claim 1 wherein the storage device is portable and detachably connected to the vehicle.

6. The system of claim 1 wherein the camera is further equipped with a wide angle lens.

7. The system of claim 1 wherein the captured images are automatically stored to a large capacity storage device, capable of storing at least one hour of images.

8. The system of claim 1 wherein the prepared recording segments are automatically stored to the storage device.

9. The system of claim 1 wherein the marking switch is one of a least a toggle switch, a push button switch, a slide switch, a rocker switch, a voice-activated switch, a rotary switch, and a tactile switch.

10. A system of claim 1 wherein the edited segments are defined in accordance with predefined periods.

11. A system of claim 1 that further includes a location identification module for identifying a specific location of the marked film.

12. A method that enables a conventional vehicle operator to record continuous images of the surrounding traffic activity, wherein the vehicle is equipped with a video camera that captures continuous recordings of the vehicle surroundings, said method comprising the steps of:

marking at least one portion of the recorded activities that depicts at least one possible traffic violation committed by at least one other vehicle operator, adding marks in real-time to the continuous video recording;

preparing the recorded video segments for transmission, wherein said segments include at least one recording portion that appears before the added mark and at least one recording portion that appears after the added mark;

storing at least one portion of the camera recording; and transmitting the stored recordings to a designated server.

13. A method of claim 12 further comprising the step of detaching the storage device, moving it to an external computing device, and connecting it to the external computing device, wherein the editing and transmitting steps are preformed at the external commuting device.

14. A method of claim 12, wherein the editing of the video segments is performed at the vehicle and the transmitting is performed through a wireless communication network directly from the vehicle to a designated device.

15. A method of claim 12, wherein the storage device is connected to a computer that transmits the at least one edited recording through a communication network.

16. A method of claim 12 wherein the edited video segments are defined in accordance with predefined time periods.

\* \* \* \* \*